United States Patent
Storer et al.

(10) Patent No.: US 6,609,479 B2
(45) Date of Patent: Aug. 26, 2003

(54) BIRD VACCINATING DEVICE AND METHOD OF OPERATION

(75) Inventors: Richard Storer, Lula, GA (US); Joe Dyer, Gainesville, GA (US)

(73) Assignee: Merial Limited, Harlow (GB)

( * ) Notice: Subject to any disclaimer, the term of this patent is extended or adjusted under 35 U.S.C. 154(b) by 0 days.

(21) Appl. No.: 10/035,341

(22) Filed: Jan. 4, 2002

(65) Prior Publication Data

US 2002/0104489 A1 Aug. 8, 2002

Related U.S. Application Data

(60) Provisional application No. 60/259,709, filed on Jan. 5, 2001.

(51) Int. Cl.[7] .............................................. A01K 37/00
(52) U.S. Cl. ....................................... 119/716; 119/843
(58) Field of Search .............................. 119/701, 713, 119/716, 843; 452/188

(56) References Cited

U.S. PATENT DOCUMENTS

| | | | | |
|---|---|---|---|---|
| 3,166,785 A | * | 1/1965 | Lemmond | 452/183 |
| 3,759,229 A | * | 9/1973 | Farrington | 119/716 |
| 3,774,578 A | * | 11/1973 | Randolph et al. | 119/714 |
| 4,094,413 A | * | 6/1978 | Altenpohl et al. | 209/592 |
| 4,446,819 A | * | 5/1984 | Gourlandt | 119/714 |

* cited by examiner

Primary Examiner—Robert P. Swiatek
(74) Attorney, Agent, or Firm—Larson & Taylor PLC

(57) ABSTRACT

The bird vaccinating device comprises a frame, a drum or carosel rotatable on a vertical axis or this frame, schackle means for attaching birds, and being angularly spaced on said drum, motor means to rotate said drum, to present the bird successively to different operating stations, wherein said drum has a polygonal shape, preferably octagonal, each lateral side of the polygon providing a flat surface, said schackle means protruding from said surface so that an attached bird can be backed on to this flat surface by the vaccinator for proper vaccination. Preferably means are provided to cause the drum to stop if grasped by a vaccinator and to release automatically the vaccinated bird, preferably on a slide, as well as to count the vaccinated birds.

22 Claims, 6 Drawing Sheets

BIRD VACCINATING DEVICE AND METHOD OF OPERATION

CROSS REFERENCE TO RELATED APPLICATIONS

This application claims benefit of U.S. Provisional Application No. 60/259,709, filed on Jan. 5, 2001.

BACKGROUND OF THE INVENTION

The present invention generally relates to the art of vaccinating birds, including but not limited to pullets.

More particularly, the invention relates to a rotating bird vaccinating device in the form of a rotating drum or carousel turned by an electric motor and having means, such as shackles, which hold the birds upside down by the legs, in order to present the bird to the vaccinator, where said drum turns before successive fixed stations, including a first station to attach the bird, one or several vaccination stations for the vaccinators, and a releasing station where the bird is released from the drum.

The invention also relates to a method which makes use of the improved device according to the invention.

Presently such kind of pullet vaccinating devices are on public use. These machines comprise a cylindrical drum turning on a vertical shaft and chain driven by an electrical motor connected to a power source.

Such known devices need a trained staff, to attach the pullet, to vaccinate the birds and to release the vaccinated pullets.

Using such machines leads sometime to inaccurate vaccination, for example in the event the drum must be suddenly stopped, which requires one operator to disconnect the power source and there is a risk of vaccinating some birds twice or just omitting to vaccinate them because of the time needed for the drum to stop. Further, the vaccinators cannot know how many birds are vaccinated, unless they try to count the birds.

Some of these known machines have a cylindrical drum surface to which the pullet can be backed on by the vaccinator, which may result in some stress to the animal.

These machines are often cumbersome and are not very practical for the vaccinators who generally have to stand during the whole vaccination sequences.

SUMMARY OF THE INVENTION

It is an object of the invention to provide bird vaccinating devices which results in more accurate vaccination of the birds, even if several distinct vaccines are administered.

Another object of the invention is to reduce the stress of the birds during the vaccination step.

Another object is to allow each operator or vaccinator to stop and restart the machine immediately.

Another object is to allow an accurate and simple counting of the vaccinated birds.

Another object is to reduce the staff needed to operate the vaccinating device.

Another object is to speed up the vaccination rate of birds.

Another object is to allow the vaccinators to work in a comfortable position.

According to a first embodiment of the invention, the bird vaccinating device comprises a frame, a drum or carousel rotatable on a vertical axis on this frame, shackle means for attaching birds, and being angularly spaced on said drum, motor means to rotate said drum, to present the bird successively to different operating stations, wherein said drum has a polygonal shape, preferably octagonal, each lateral side of the polygon providing a flat surface, said shackle means protruding from said surface so that an attached bird can be backed on to this flat surface by the vaccinator for proper vaccination.

By providing such a polygonal, preferably octagonal, shape of the drum with flat surfaces, for example vertical plates forming said lateral sides, the pullet can be backed on to a flat surface whereby the stress on the pullet is reduced compared to the stress of being pressed against the usual convex cylindrical surface of a drum.

This octagonal or polygonal shape also allows, if needed, to provide more than one shackle means per lateral side, whereby more than one, for example two pullets can be attached on one lateral side for increasing the rate of vaccination without increasing the rotation speed.

According to another improvement, a bird vaccinating device according to the present invention comprises a frame, a drum or carousel rotatable on a vertical axis on this frame, shackle means for attaching birds, being angularly spaced on said drum, motor means to rotate said drum, to present the birds successively to different operating stations, wherein said drum or carousel is cinematically driven by the motor means through drive disconnecting means able to be actuated by any member of a staff, to immediately stop the drum while the motor continues to run, and to immediately restart the rotation of the drum, if wanted.

This rotation disconnecting means can, for example, comprises clutch means with various clutch control means angularly spaced around the frame to be actuated from each working station.

But, according to a preferred embodiment, this disconnecting means comprises friction means, such as, for example, frictionally mutually engaged discs, whereby the drum can be immediately stopped by an operator grasping the drum and immediately restarted when the operator releases the drum.

This allows to immediately stop the drum by the proper operator if needed and to have it restarted after a short time, without disconnecting the power source. Further once an operator, for example a vaccinator, stops the drum, he keeps the side of the polygon with the relevant pullet in front of him, instead of having the drum continuing to rotate for a short time while he goes to disconnect the power source.

It also prevents risks or injuries if the drum is blocked accidentally.

According to another embodiment of the improved vaccinating device according to the invention, the device comprises a frame, a drum or carousel rotatable on a vertical axis on this frame, shackle means for attaching birds, said shackle means being angularly spaced on said drum, motor means to rotate the drum, to convey a bird successively to different operating stations, wherein said shackle means are responsive to a shackle release means fixed at a precise angular location of the frame to release automatically the bird once the shackle means reaches an angular location corresponding to said shackle releasing means.

In such embodiment there is preferably provided a slide or other receiving and transportation means which gently receives the falling pullet to transport the pullet away from the device.

According to another embodiment of the present invention, the bird vaccinating device comprises a frame, a drum or carousel rotatable on a vertical axis on this frame, a shackle means for attaching birds, said shackle means being angularly spaced on said drum, motor means to rotate said drum, to present the bird successively to different operating stations, wherein there is provided a pullet counter which automatically counts the number of pullets released from the shackle. Preferably this counter is a mechanical counter.

In a preferred embodiment, this counter is located either on the frame, at the bird release station, or on the slide or other transportation means for the released bird.

DESCRIPTION OF THE PREFERRED EMBODIMENT

While the preferred embodiment is shown on FIGS. 1, 5, 6, 7, FIGS. 2, 3, 4 are used to show the driving and sliding disc means and the shape of the shackles.

Figure 1:
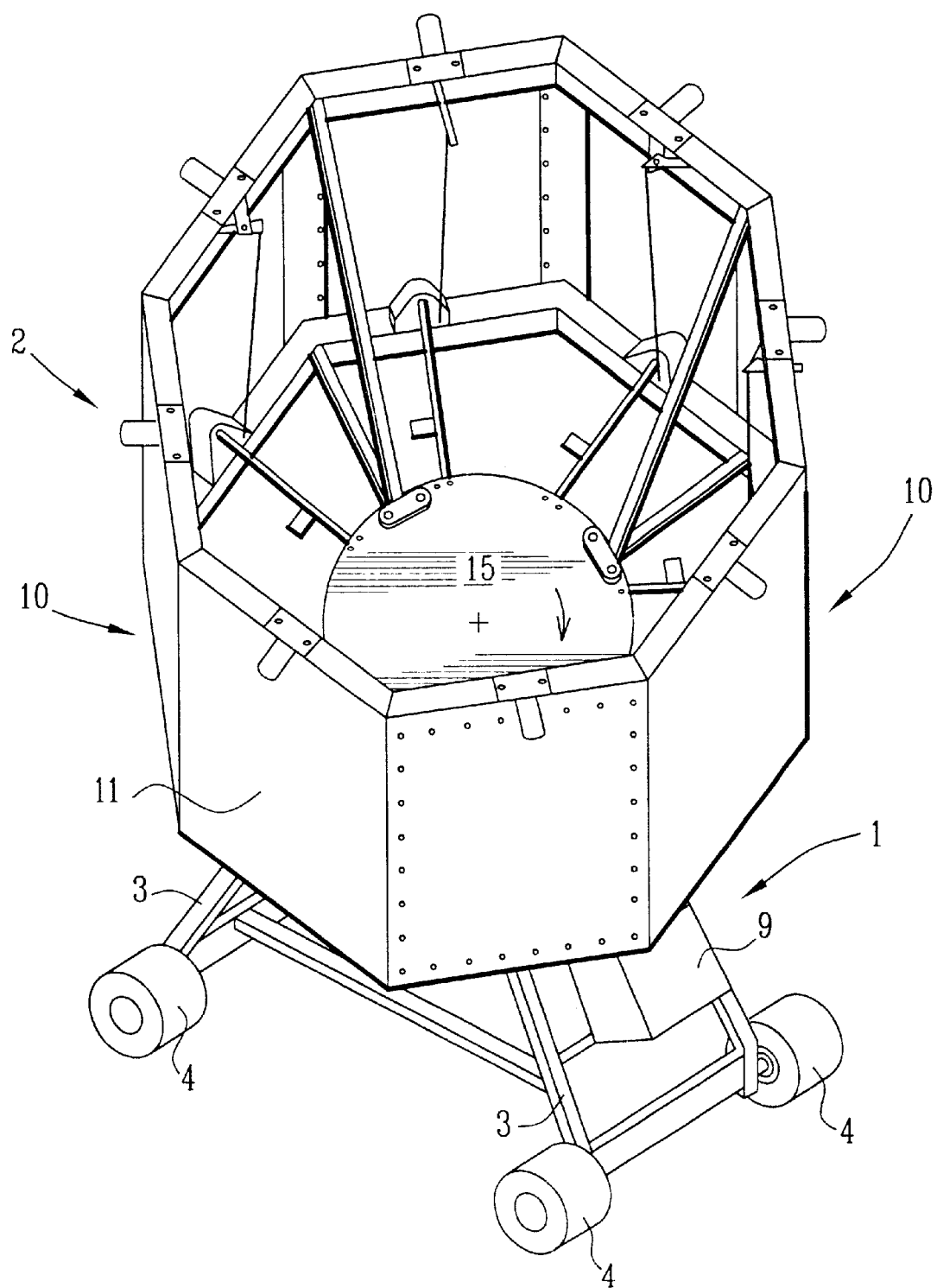
FIG. 1 is general view of a bird vaccinating device according to a preferred embodiment of the invention.
Figure 2:
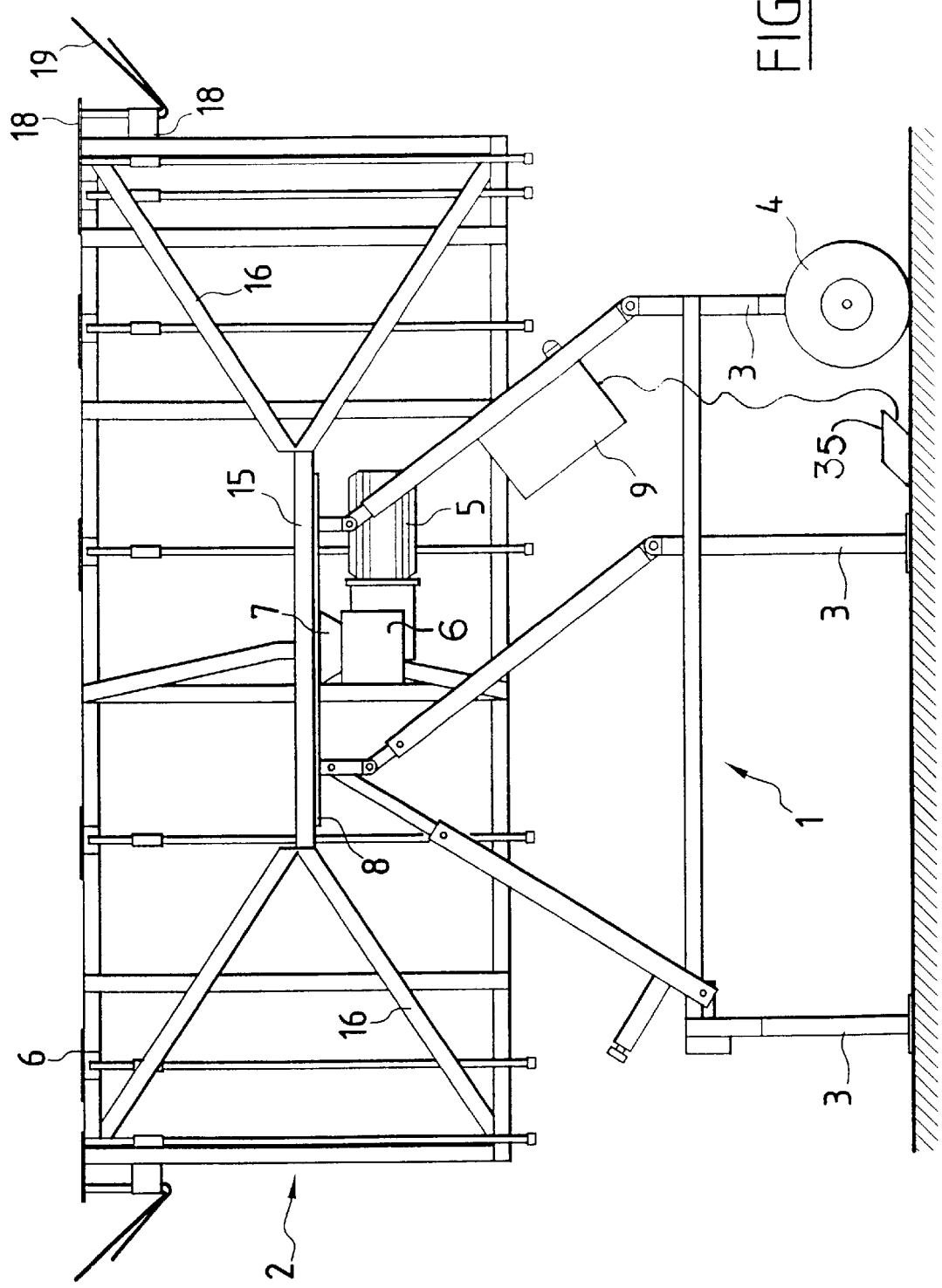
FIG. 2 is a side elevation of another embodiment where the lateral plates are omitted.

With reference to the figures, there is provided a rotating bird vaccinating device comprising a frame 1 and a rotating carousel like drum 2. Frame 1 has vertical legs 3, provided with wheels 4 for rolling the device. Frame 1 rigidly supports a motor and gear box assembly having an electrical motor 5 and a gear box 6 whose output vertical shaft is rigidly fastened to a hub 7 whereby the hub 7 is driven by the output shaft. Hub 7 rigidly supports a lower horizontal disc 8 which is thereby rotatively driven with the shaft (FIG. 2). Frame 1 supports a control panel 9 having switching means to connect or disconnect electrical power to motor 5. Means can also be provided on the panel to vary the rotation speed of the electrical motor 5, as well as the clockwise or counterclockwise direction of the rotation. Further a remote system pause can be provided, for example a foot pedal actuated switch 35 to allow a designated operator to pause the rotation.

Drum 2 has the shape of an octagon having eight vertical lateral sides 10, each side harboring a rectangular vertical metal plate 11. As better seen on FIG. 5, the structure of wheel 2 comprises upper and lower octagonal assemblies 12, 13 being connected at each apex by vertical legs 14. A central disc 15 is rigidly mounted centrally in this octagonal cage by a pair of oblique bracings 16 whose proximal ends are secured to the periphery of disc 15 and whose distal ends are respectively secured to apexes of the upper and lower polygon assemblies 12, 13. Plates 11 are welded or otherwise secured to the octagonal drum sides to form the lateral sides thereof.

While the upper side of disc 15 is flat, its lower side has a large central recess surrounded by a peripheral rim, which recess has a diameter slightly larger than the diameter of the lower disc 8. As better seen on FIG. 2, when a drum is mounted on the frame, upper disc 15 engages lower disc 8 which penetrates into the central large recess. The peripheral rim of disc 15 would prevent any substantial lateral displacement of one disc with respect to the other. The friction between the upper side of the lower disc 8 and the internal side of the recess of the upper disc 15 is such that when lower disc 8 is rotated by the motor-gear box assembly, the upper disc 15, and, accordingly, the drum 2, is driven at the same speed. However if the rotation of the drum is hindered, for example by an operator grasping the drum, the discs will slide with respect to each other. In other words, disc 8 and 15 provide a kind of frictional clutch which allows the upper disc to be easily disconnected from the rotation of the lower disc by an operator which retains the drum.

Disc 15 has a central bore through which the upper end of the vertical output shaft can freely extend and a means can be provided, such as a nut screwed on the upper end of the shaft to prevent disc 15 to be vertically removed from disc 8 while allowing both discs to slide respectively if needed.

Figure 5:
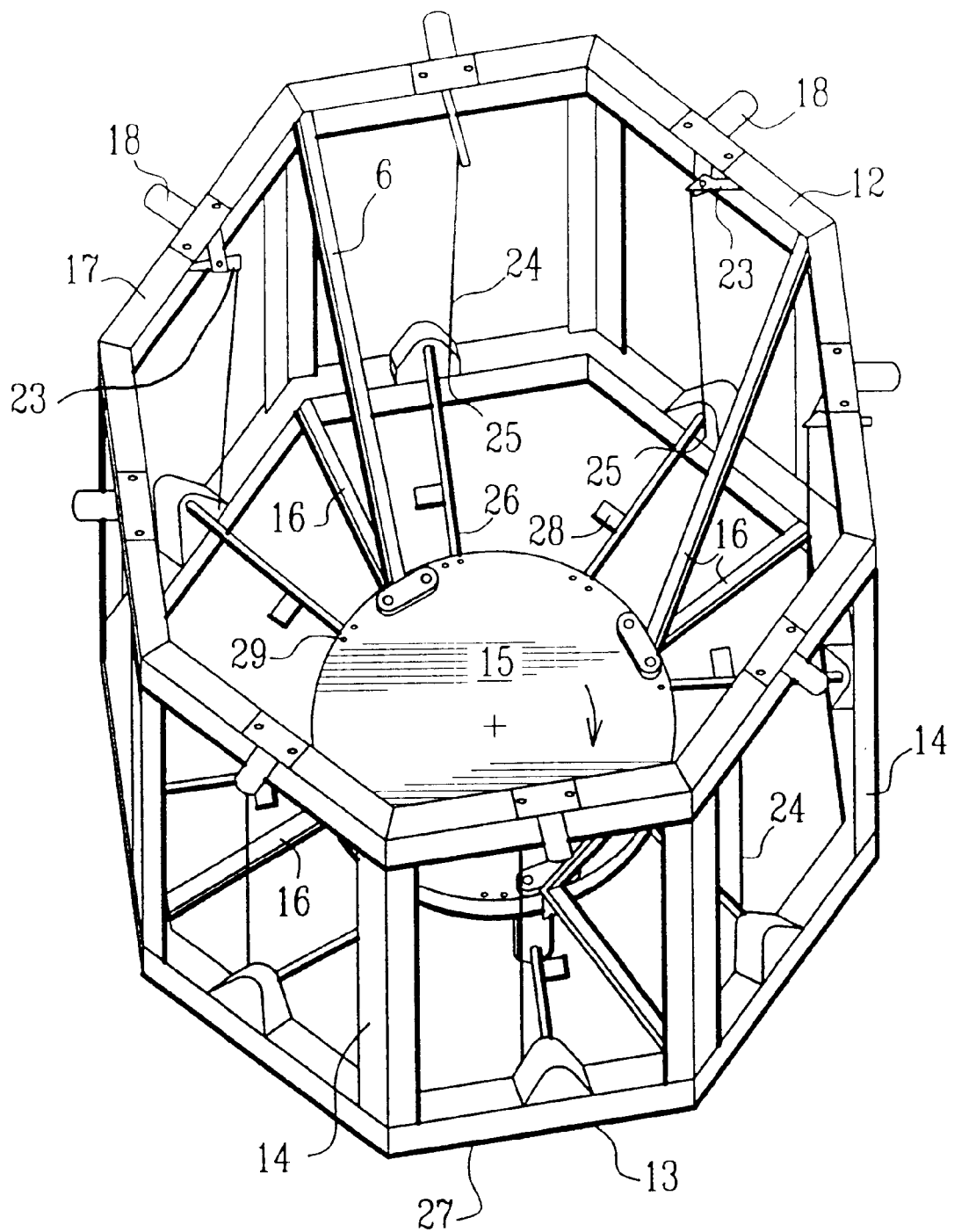
FIG. 5 is a general view of the preferred drum where the lateral plates are omitted.

As best seen on FIG. 5, the horizontal sides of the upper octagonal assembly 12, which are formed of bars 17, provide radial brackets 18 which protrude radially outside from the plate 11. As better seen on FIG. 2, brackets 18 provide also a lower part forming a horizontal hinge for shackles. Shackle 19 comprises a rigid metal wire having a M form having a central V shaped part 20 and two radial end parts 21. Accordingly there is provided between each end part 21 and the central V shaped part 20, a tapered recess 22 in which a leg of a pullet can be introduced in such a way that the pullet can be maintained upside down by its two legs in the recesses 22 of a shackle 19. As the shackles 19 are normally in an oblique position with their external parts pointing upwardly, one understands that the legs of the pullet, whose feet prevent it from falling down, will be urged to the apexes of the shackle due to the weight of the pullet. On the other side, if bracket 19 is tilted down and points obliquely and downwardly, the legs of the pullet will slide out of recesses 22 and the pullet will be released from the wheel.

The shackles 19 are normally oriented outwardly and upwardly according to FIG. 2, and are maintained in this orientation by a latch hook 23 having a lever form which is journalled on the upper octagonal assembly. Lever 23 is hinged to a lever rod 24 which is hinged to the end of a short lateral arm 25 secured to a shaft 26 having a lever form which is journalled at respective ends on the lateral bar 27 of the lower polygon 13 and on a hinge 29 affixed on the disc 15 (FIG. 5). A lateral tab 28 extends from the shaft in a direction opposite to arm 25. During rotation of the drum 2, when this tab 28 encounters a static cam 34 mounted at proper location on frame 3, shaft 26 will be rotated, whereby lever 23 is tilted, which allows the corresponding shackle 19 to tilt downwardly and release the bird. After the bird is released the shackle reverts to its upper oriented position and once the tab 28 escapes the cam 34, the latch hook 23 engages the shackle. Of course, rod arrangement 24 can be replaced by equivalent pull means, such as a pull cable, which allows more flexibility for the location of the shackle actuation control means.

Figure 6:
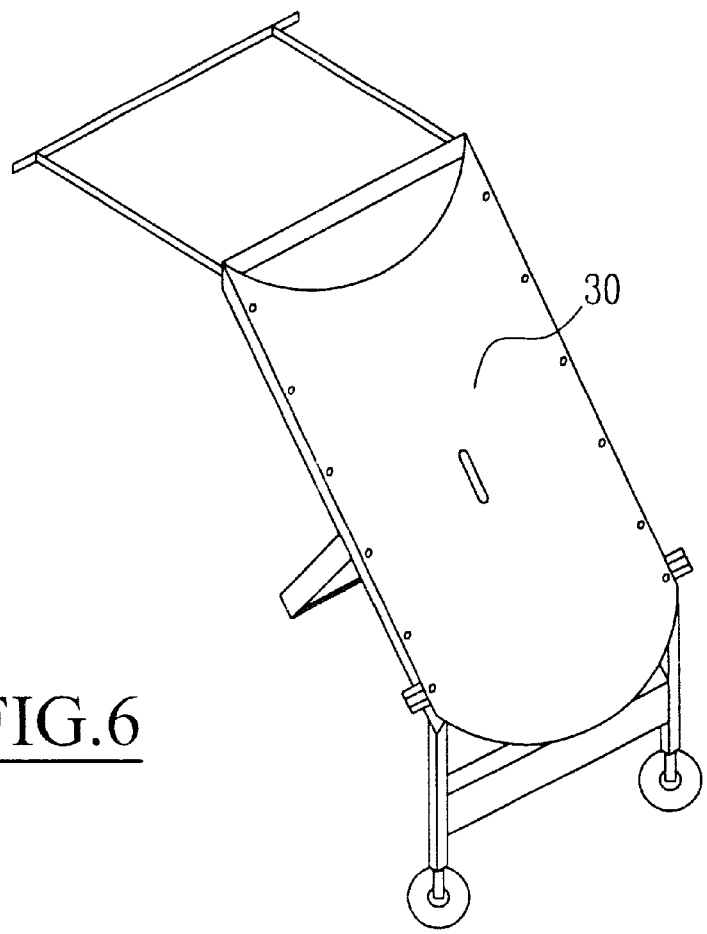
FIG. 6 is a view of the slide of the device.
Figure 7:
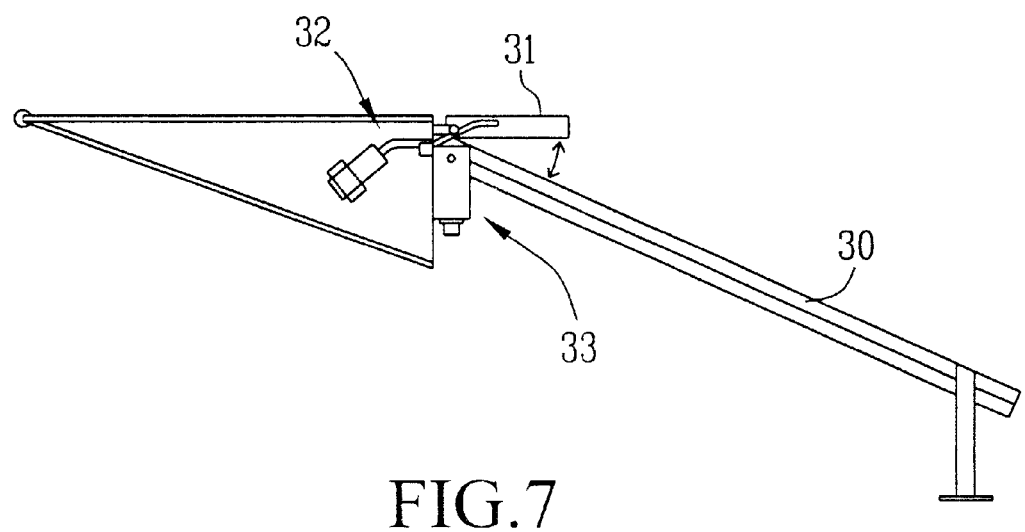
FIG. 7 is a schematic view of the slide with a counting pallet.

With reference to FIG. 6, there is provided a funnel like slide 30 mounted on a wheeled frame, which is adapted to be located radially with respect to drum 2 in such a position that a pullet which is released from shackle 19 at the corresponding angular releasing station, will fall on the slide and slide downwardly to be finally released. Preferably, a mechanical counter is fixed on the slide 30 in such a position that each pullet which slides downwardly on slide 30, actuates the counter by one increment. Preferably, the counter comprises a lightweight pivoting pallet 31 at the top of slide 30 which is biased to its horizontal rest position by a counterweight 32. As a bird is released from the shackle it falls on pallet 31 and causes it to deflect. The deflection is counted by a microswitch 33. The dimension of the pallet is enough to allow birds falling from each direction to be counted accurately.

Figure 3:
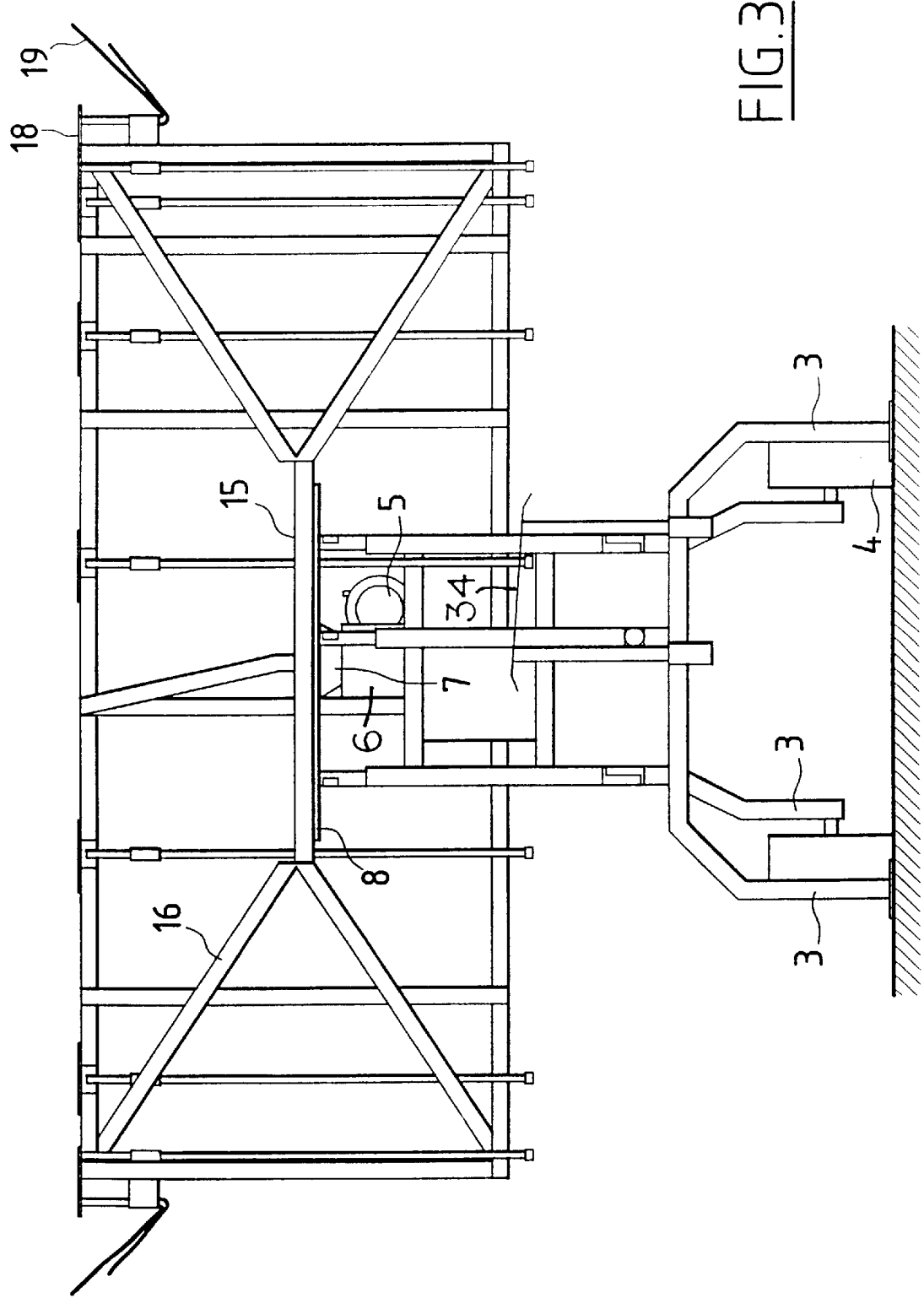
FIG. 3 is a front elevation corresponding to FIG. 2.
Figure 4:
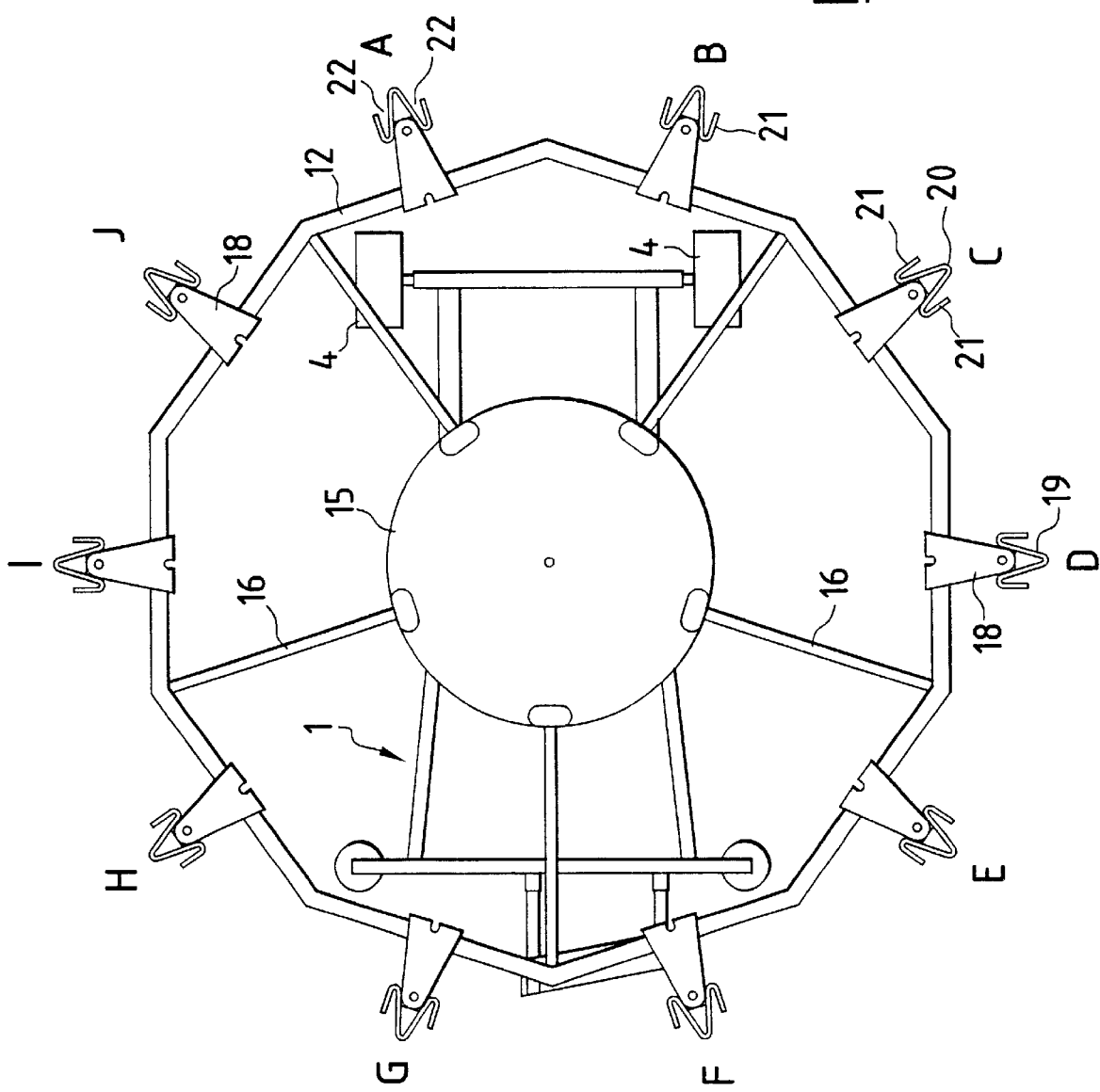
FIG. 4 is a schematic top view of the device (with a decagonal drum) corresponding to FIG. 2.

The operation is as follows:

The device according to the invention can be introduced in a poultry farm through normal doors as it can have an external diameter which is less than usual farm door width. This also allows transportation on an usual pick-up truck. Once the device is at the proper place, it provides eight working stations A to H (assuming the drums of FIG. 3 is modified to an octagonal drum). Assuming the cam 34 is located at the angular position corresponding to location H, location H will form the pullet releasing station and the slide 30 will be accordingly located under the drum at location H. As the device is clockwise rotated, the next station, namely A, will be the station where an operator hangs the pullet on the shackle 19.

Locations B to G can be used for vaccinators. If needed, location B, which is directly downstream location A, could be used for a second operator to hang a pullet on a shackle. In this event location B will not be available for a vaccinator.

Once the drum is rotated with a pullet, maintained upside down close to a lateral plate 11, the pullet will reach a successive station, for example station C, where the vaccinator administers the vaccine, for example, a parenteral or an ocular vaccine. It is easy for the operator to gently press the pullet against plate 11 to maintain it motionless with one hand in order to vaccinate it with the other hand according to any suitable administration routine, for example wingweb transfixion or eye drop administration. As the pullet is gently pressed on a flat surface, it would not be stressed as it would on a cylindrical convex drum. Once the pullet reaches location H, the shackle is tilted by the cam 34 and the pullet is released and counted.

If one of the operators or vaccinators needs to temporarily stop the wheel he just grasps the drum at any location and the drum will stop while the motor and the lower disc will still rotate. As soon as he releases the drum, the slight frictional engagement between plate 8 and 15 will again drive the drum to rotate.

The frame 1 is preferably designed to maintain the drum at a vertical level which allows the vaccinators to seat on foldable chairs at the relevant vaccinating station, instead of standing during the whole vaccination campaign. As an alternative, seats can be directly mounted on the frame.

The vertical dimension of the drum can be adapted to the size of the bird to be vaccinated. For example, one can provide a drum having a sufficient height for maintaining and vaccinating turkeys or other big birds. In such event the same drum could be used for smaller fowls like pullets. A larger octagonal drum can be provided with large lateral sides, with several shackles per side in order to maintain several birds close to a same plate 11.

The device according to the invention gives easy access to all its components. Accordingly it can be readily disinfected before use. Preferably its components are made of easy to disinfect materials, for example stainless steel.

What is claimed is:

1. A bird vaccinating device comprising a frame, a drum rotatable on a vertical axis on this frame, shackle means for attaching birds, and being angularly spaced on said drum, motor means to rotate said drum, to present the bird successively to different operating stations, wherein said drum has a polygonal shape providing corresponding vertical lateral sides, each lateral side providing a flat surface, and wherein said shackle means protrude from said flat surface so that an attached bird can be backed on to this flat surface by the vaccinator for proper vaccination.

2. A bird vaccinating device according to claim 1 wherein said polygon is an octagon.

3. A bird vaccinating device according to claim 1 wherein said drum is cinematically driven by the motor means through drive disconnecting means able to be actuated by any member of a staff, to immediately stop the drum while the motor continues to run, and to immediately restart the rotation of the drum when the drive disconnecting means is de-actuated.

4. A bird vaccinating device according to claim 3, wherein said disconnecting means comprises frictionally mutually engaged discs, whereby the drum can be immediately stopped by an operator grasping the drum and immediately restarted when the operator releases the drum.

5. A bird vaccinating device according to claim 1 wherein said shackle means are responsive to a shackle release means fixed at a precise angular location of the frame to release automatically the bird once the shackle means reaches an angular location corresponding to said shackle releasing means.

6. A bird vaccinating device according to claim 5, comprising a slide which gently receives the falling bird to transport the bird away from the device.

7. A bird vaccinating device according to claim 1, comprising a frame wherein there is provided a bird counter which automatically counts the number of birds released from the shackle.

8. A bird vaccinating device according to claim 7, wherein this counter is located at a bird release station on a slide for the released bird.

9. A bird vaccinating device according to claim 8, at the top of said slide, a deflectable biased pallet to be deflected by a falling bird, and a counting means actuated by said pallet.

10. A bird vaccinating device according to claim 1, wherein said shackle means has an M form having a central V shaped part and two end parts being radial with respect to said flat surface to form tapered recesses in which legs of the bird can be introduced.

11. A bird vaccinating device according to claim 10 wherein said shackle means is hinged in a normally oblique position pointing upwardly to prevent feet of the bird from falling down and out of said recesses, said shackle means being tiltable downwardly to release the bird.

12. A bird vaccinating device according to claim 1, wherein said shackle means are actuated by a fixed cam located at a position suitable to tilt the shackle means to release the bird at a bird releasing station.

13. A bird vaccinating device according to claim 1 comprising control means to vary one of a speed or a direction of the rotation of said drum.

14. A bird vaccinating device according to claim 1 comprising a remote pause control means.

15. A bird vaccinating device comprising:

a frame, a drum rotatable on a vertical axis on this frame, shackle means for attaching birds, being angularly spaced on said drum, motor means to rotate said drum, to present the birds successively to different operating stations, wherein said drum is cinematically driven by the motor means through drive disconnecting means able to be actuated by any member of a staff, to immediately stop the drum while the motor continues to run, and to immediately restart the rotation of the drum when the drive disconnecting means is de-actuated.

16. A bird vaccinating device according to claim 15 wherein said drive disconnecting means comprises a clutch with various clutch control means angularly spaced around the frame to be actuated from each working station.

17. A bird vaccinating device according to claim 15 wherein said disconnecting means comprises frictionally mutually engaged discs, whereby the drum can be immediately stopped by an operator grasping the drum and immediately restarted when the operator releases the drum.

18. A bird vaccinating device comprising:

a frame, a drum having substantially vertical and angularly spaced sides and being rotatable on a vertical axis on this frame, shackle means for attaching respective birds to respective said sides of said drum, said shackle means being angularly spaced on said drum to allow the birds to be backed against the respective said side, motor means to rotate the drum, to convey a bird successively to different operating stations, and shackle release means, to which said shackle means are responsive, fixed at a precise angular location of the frame to release automatically the bird once the shackle means reaches an angular location corresponding to said shackle release means.

19. A bird vaccinating device according to claim 18, comprising a slide which gently receives the falling bird to transport the bird away from the device.

20. A bird vaccinating device comprising:

a frame, a drum having substantially vertical and angularly spaced sides and being rotatable on a vertical axis on this frame, shackle means for attaching respective birds to respective said sides of said drum, said shackle means being angularly spaced on said drum to allow each bird to be backed against a respective one of said sides, motor means to rotate said drum, to present the bird successively to different operating stations, and a bird counter which automatically counts the number of birds which are released from the shackle means.

21. A bird vaccinating device according to claim 20, wherein this counter is located at a bird release station, on a slide for the released bird.

22. A bird vaccinating device according to claim 21, comprising, at the top of said slide, a deflectable biased pallet to be deflected by a falling bird, and a counting means actuated by said pallet.

* * * * *